Figure 1:
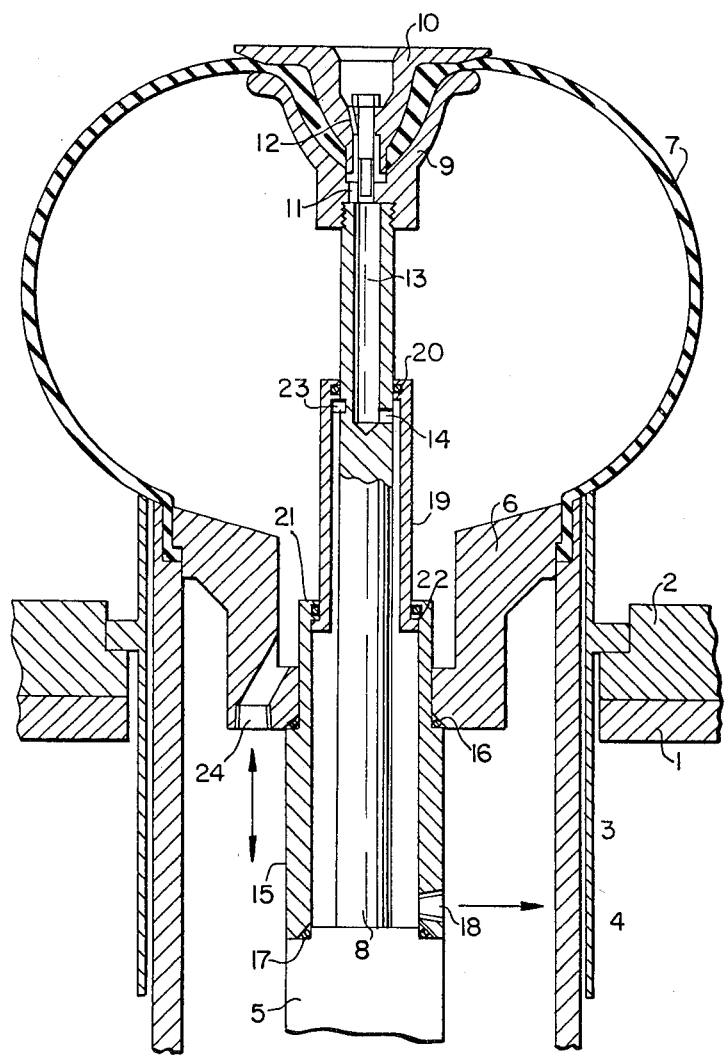

United States Patent [19]

Sakaguchi et al.

[11] 4,445,834

[45] May 1, 1984

[54] DRAIN DISCHARGE DEVICE IN A TIRE CURING MACHINE

[75] Inventors: Katsuyoshi Sakaguchi; Akira Hasegawa, both of Nagasaki, Japan

[73] Assignee: Mitsubishi Jukogyo Kabushiki Kaisha, Tokyo, Japan

[21] Appl. No.: 511,293

[22] Filed: Jul. 6, 1983

[51] Int. Cl.³ .......................... B29D 29/00; B29H 5/00
[52] U.S. Cl. ............................................ 425/36; 425/58
[58] Field of Search ...................... 425/33, 35, 36, 48, 425/58

[56] References Cited

U.S. PATENT DOCUMENTS

| | | | |
|---|---|---|---|
| 3,170,191 | 2/1965 | Burkhart | 425/36 |
| 3,659,973 | 5/1972 | Yoshida et al. | 425/58 X |
| 3,690,795 | 9/1972 | Yoshida et al. | 425/58 X |
| 4,184,823 | 1/1980 | Williams | 425/58 X |

Primary Examiner—J. Howard Flint, Jr.
Attorney, Agent, or Firm—Wenderoth, Lind & Ponack

[57] ABSTRACT

An improved drain discharge device in a tire curing machine is described here, in which a drain discharge blind bore communicating with drain discharge paths provided in an upper ring and a bladder fastener, respectively, both mounted at the top end of a rod of a center cylinder and clamping the top end of a bladder therebetween and having a drain port at its lower end is provided within the rod of the center cylinder, also the center cylinder is provided with a spacer formed integrally with the center cylinder and having a drain discharge port at its lower end, and between the spacer and the rod is provided a movable sleeve covering the drain port which sleeve is slidable relative to the respective ones of the spacer and the rod and has its sliding surfaces sealed.

1 Claim, 1 Drawing Figure

DRAIN DISCHARGE DEVICE IN A TIRE CURING MACHINE

The present invention relates to improvements in a drain discharge device in a tire curing machine.

In a tire curing machine of a dome type heating system, steam within a dome would condense into a drain, this drain would accumulate at the top of a curing bladder, then it would spill and fall between a green tire and the bladder upon curing the next green tire, resulting in one cause of production of unacceptable tires, and therefore, it is necessary to externally discharge the drain. Such drain discharge devices have been proposed many kinds in the prior art, but in any case, not only the structure is complexed but the proposed devices had a shortcoming that during curing of a tire, steam within the dome would flow out jointly with the drain. Therefore, the inventors of this invention proposed a method for eliminating the aforementioned shortcoming and filed Japanese Utility Model Registration Application No. 49-104422 (Utility Model Registration Publication No. 53-12787). However, since this proposed device has such structure that a drain discharge piping is connected to the lower end of a drain discharge blind bore provided within a rod of a center cylinder, there was a short-coming that in the case of using a large bladder, the center cylinder became long and hence it was necessitated to dig a deep pit. The present invention has been worked out in view of the aforementioned background of the invention.

It is therefore one object of the present invention to provide a drain discharge device in a tire curing machine which necessitate only a small base pit, and moreover in which discharge of a drain is perfect and leakage of steam to the external atmosphere can be surely prevented.

According to one feature of the present invention, there is provided a drain discharge device in a tire curing machine, in which a drain discharge blind bore communicating with drain discharge paths provided in an upper ring and a bladder fastener, respectively, both mounted at the top of a rod of a center cylinder and clamping the top end of a bladder therebetween and having a drain port at its lower end, is provided within the rod of the center cylinder, in which the center cylinder is also provided with a spacer formed integrally with the center cylinder and having a drain discharge port at its lower end, and in which between the spacer and the rod is provided a movable sleeve covering the drain port which sleeve is slidable relative to the respective ones of the spacer and the rod and has its sliding surfaces sealed.

Since the drain discharge device in a tire curing machine has the above-featured structure, a drain port is not opened to the interior of the bladder, hence leakage of steam to the external atmosphere can be surely prevented even upon warming-up of the bladder, also the top drain can be perfectly discharged from the drain discharge port through the drain discharge paths, the drain discharge blind bore, the drain port, the movable port and the spacer, and moreover, even in the event that the center cylinder becomes long, there is no need to dig a base pit deeply but the base pit can be made small.

The above-mentioned and other objects, features and advantages of the present invention will become more apparent by reference to the following description of a preferred embodiment of the invention taken in conjunction with the accompanying drawing consisting of one sheet, wherein:

FIG. 1 is a cross-section view of only an essential part of one preferred embodiment of the present invention.

In the following, the present invention will be described in greater detail in connection to the illustrated embodiment.

In the cross-section view of an essential part only of the embodiment shown in FIG. 1, reference numeral 1 designates a base of a curing machine, numeral 2 designates a lower dome, numeral 3 designates an outer cylinder mounted to the lower dome 2, numeral 4 designates an inner cylinder that is slidable within the outer cylinder 4, numeral 5 designates a center cylinder, numeral 6 designates a lower ring coupled to the center cylinder 5 via tie rods not shown, and a lower end of a bladder 7 is clamped between the lower ring 6 and the inner cylinder 4. Reference numeral 8 designates a rod of the center cylinder 5, and at the top end of the rod 8 is mounted an upper ring 9 to clamp the top end of the bladder 7 with the aid of a bladder fastener 10. In the upper ring 9 and the bladder fastener 10 are respectively provided drain discharge paths 11 and 12 which are communicated with each other.

Reference numeral 13 designates a drain discharge blind bore provided within the rod 8, and at the lower end of the blind bore 13 is provided a drain port 14. Reference numeral 15 designates a spacer inserted in the center hole of the lower ring 6 as sealed by means of seal members 16 and 17, and integrally coupled to the center cylinder 5 via tie rods not shown of the center cylinder 5, and at the lower end of the spacer 15 is provided a drain discharge port 18. Reference numeral 19 designates a movable sleeve provided between the spacer 15 and the rod 8 so as to cover the drain port 14, which sleeve is slidable relative to the spacer 15 and the rod 8, respectively, and has its sliding surfaces sealed with seal members 20 and 21, respectively. In addition, reference numeral 22 designates a claw provided at the lower end of the movable sleeve 19, numeral 23 designates a stopper pin or a stopper ring provided on the rod 8, and numeral 24 designates a steam inlet/outlet port provided in the lower ring 6.

FIG. 1 shows the state where the bladder 7 is being warmed up. Then steam introduced through the steam inlet/outlet port 24 is expanding and warming up the bladder 7, but the drain port 14 is sealed off by the actions of the seal member 20 provided on the movable sleeve 19 and the seal member 21 provided on the spacer 15, hence the steam would not leak into the drain discharge blind bore 13, and at this moment, the stopper pin 23 and the claw 22 of the movable sleeve 19 achieve the positioning of the movable sleeve 19 so that the drain port can be always sealed off.

Accordingly, the drain within the dome can be perfectly discharged from the drain discharge port 18 through the drain discharge paths 11 and 12, the drain discharge blind bore 13, the drain port 14, the inside of the movable sleeve 19 and the inside of the spacer 15, and at the same time, even upon warming-up of the bladder, leakage of steam to the external atmosphere can be surely prevented. In addition, in the case of using a large bladder, even if the center cylinder becomes long, the base pit can be made small because of the above-mentioned construction of the drain discharge device.

What is claimed is:

1. A drain discharge device in a tire curing machine, characterized in that a drain discharge blind bore communicating with drain discharge paths provided in an upper ring and a bladder fastener, respectively, both mounted at the top of a rod of a center cylinder and clamping the top end of a bladder therebetween and having a drain port at its lower end, is provided within the rod of said center cylinder, that said center cylinder is also provided with a spacer formed integrally with said center cylinder and having a drain discharge port at its lower end, and that between said spacer and said rod is provided a movable sleeve covering said drain port which sleeve is slidable relative to the respective ones of said spacer and said rod and has its sliding surfaces sealed.

* * * * *